United States Patent
Kaiser et al.

(10) Patent No.: US 8,269,386 B2
(45) Date of Patent: Sep. 18, 2012

(54) PHASE LEAD CONNECTIONS FOR A BAR WOUND STATOR

(75) Inventors: Edward L. Kaiser, Orion, MI (US); John C. Morgante, Sterling Heights, MI (US); Kevin P. Coleman, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 341 days.

(21) Appl. No.: 12/684,999

(22) Filed: Jan. 11, 2010

(65) Prior Publication Data

US 2010/0253165 A1 Oct. 7, 2010

Related U.S. Application Data

(60) Provisional application No. 61/167,262, filed on Apr. 7, 2009.

(51) Int. Cl.
*H02K 11/00* (2006.01)

(52) U.S. Cl. .......................................................... 310/71
(58) Field of Classification Search ..................... 310/71
See application file for complete search history.

(56) References Cited

U.S. PATENT DOCUMENTS

| | | | | |
|---|---|---|---|---|
| 7,281,910 | B2* | 10/2007 | Hasegawa | 417/410.5 |
| 7,317,269 | B2* | 1/2008 | Boyland et al. | 310/71 |
| 2003/0020344 | A1* | 1/2003 | Futami et al. | 310/71 |
| 2004/0070293 | A1* | 4/2004 | Kabasawa et al. | 310/71 |
| 2008/0265701 | A1* | 10/2008 | Ueda et al. | 310/71 |

* cited by examiner

*Primary Examiner* — Nguyen N Hanh
(74) *Attorney, Agent, or Firm* — Quinn Law Group, PLLC

(57) ABSTRACT

A stator assembly includes a stator stack and a plurality of lead conductors extending from the stator stack. A plurality of conductor terminals are each connected to a respective one of the plurality of lead conductors. A plurality of wires are each connected to a respective one of the plurality of conductor terminals and a plurality of phase lead connection terminals are each connected to at least one of the plurality of wires.

10 Claims, 2 Drawing Sheets

US 8,269,386 B2

PHASE LEAD CONNECTIONS FOR A BAR WOUND STATOR

CLAIM OF PRIORITY AND CROSS-REFERENCE TO RELATED APPLICATION

This application claims the benefit of and priority to U.S. Provisional Patent Application No. 61/167,262, filed on Apr. 7, 2009, which is hereby incorporated by reference in its entirety.

TECHNICAL FIELD

The present invention relates, generally, to a stator for an electric motor, and more specifically, to phase lead connections for a bar wound stator.

BACKGROUND OF THE INVENTION

Electric motors include stator assemblies which have conductors for the motor. In a bar wound stator assembly the conductors are solid copper bars individually inserted into a stator stack. Following assembly of the conductors in the stator stack, the individual conductors are twisted into the required positions to form a winding.

The lead conductors, i.e. those which form the connection points for the motor, are given extra length. As each electric motor is assembled the lead conductors are hand tooled into phase lead connections by bending and forming a portion of the extra length of the lead conductors. The lead conductors are bent such that the phase lead connections are located in the required angular position about the circumference of the stator assembly for the motor connections. Phase lead connections for a common phase must all align with one another. Maintaining the alignment between the conductors that form common phase lead connections is difficult. Another method to create this type of lead is to form the shaped lead conductors prior to insertion into the stator. However, this method makes insertion of the conductors into the stator difficult.

Individually tooling each of the lead conductors into the phase lead connections is a complicated and expensive process. Furthermore, between the phase lead connections and the stator stack, the lead conductors have long cantilevered or unsupported lengths of exposed copper wire which can vibrate and fatigue.

SUMMARY OF THE INVENTION

A stator assembly includes a stator stack and a plurality of lead conductors extending from the stator stack. A plurality of conductor terminals are each connected to a respective one of the plurality of lead conductors. A plurality of wires are each connected to a respective one of the plurality of conductor terminals and a plurality of phase lead connection terminals are each connected to at least one of the plurality of wires.

A method of assembling the stator assembly includes connecting one of the plurality of conductor terminals to a respective one of the plurality of lead conductors. Each of the plurality of wires is connected to a respective one of the plurality of conductor terminals and the plurality of phase lead connection terminals are connected to the plurality of wires. The wires are connected such that each of the plurality of phase lead connection terminals is connected to at least one of the plurality of wires.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
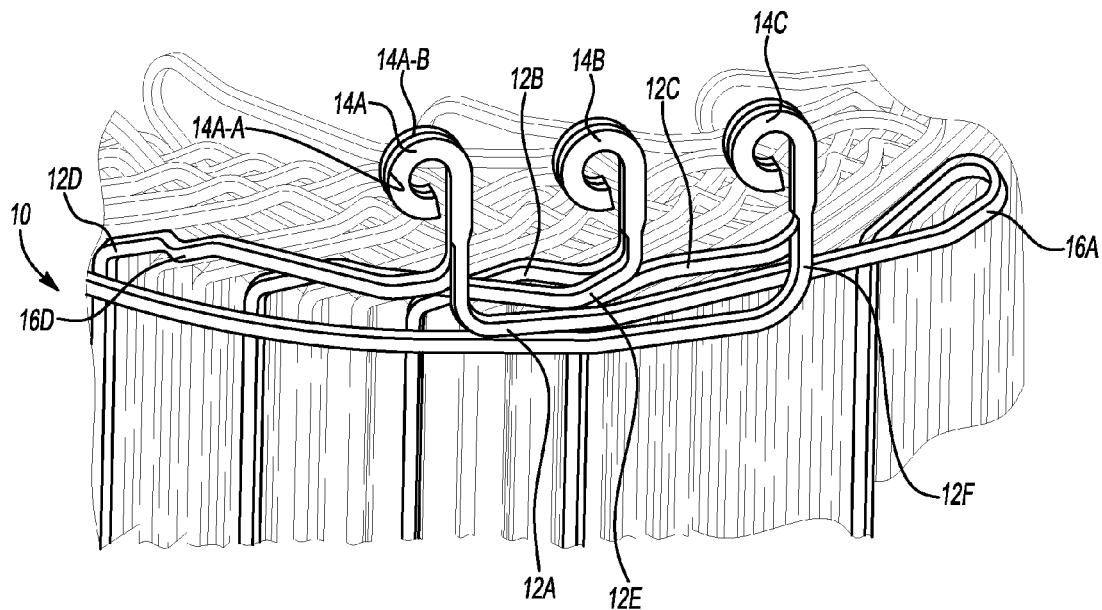
FIG. 1 is a partial schematic perspective illustration of a stator assembly of the prior art.

Referring to the Figures, wherein like reference numbers refer to the same or similar components throughout the several views, FIG. 1 schematically illustrates a partial view of a stator assembly 10 of the prior art. The stator assembly 10 is for a delta connected motor having six lead conductors 12A-F. The lead conductors 12A-F are individually tooled to form three phase lead connections 14A-C. The lead conductors 12A-F are crimped and bent into a hook shape to form the three phase lead connections 14A-C.

For example, the first conductor 12A extends from the stator assembly 10 at first rotational position. The first conductor 12A is pressed and bent to form a first portion 14A-A of the first phase lead connection 14A. The first conductor 12A is bent to locate the first phase lead connection 14A in the proper angular position about the circumference of the stator assembly 10. That is, first phase lead connection 14A is positioned in the angular position that is required for the first phase lead connection 14A for that particular stator stack assembly 10 application. The conductor 12A, prior to the first phase lead connection 14A, is formed into a first loop 16A to enable packaging of the stator assembly 10. Likewise, the fifth conductor 12D extends from the stator assembly 10 at a fifth angular position about the circumference of the stator assembly 10. The fifth conductor 12D is crimped and bent to form a second portion 14A-B of the first phase lead connection 14A. The fifth conductor 12D is bent to locate the first phase lead connection 14A in the proper angular position about the circumference of the stator assembly 10. The fifth conductor 12D is formed into a fourth loop 16D to enable packaging of the stator assembly 10. The first conductor 12A and the fifth conductor 12D align with each other to form the first phase lead connection 14A. The first conductor 12A and the fifth conductor 12D may be secured together to assist in maintaining alignment with one another to form the first phase lead connection 14A.

This process is repeated for the third conductor 12B and the forth conductor 12E to form the second phase lead connection 14B, and with the second conductor 12C and the sixth conductor 12F to form the third phase lead connection 14C.

Figure 2:
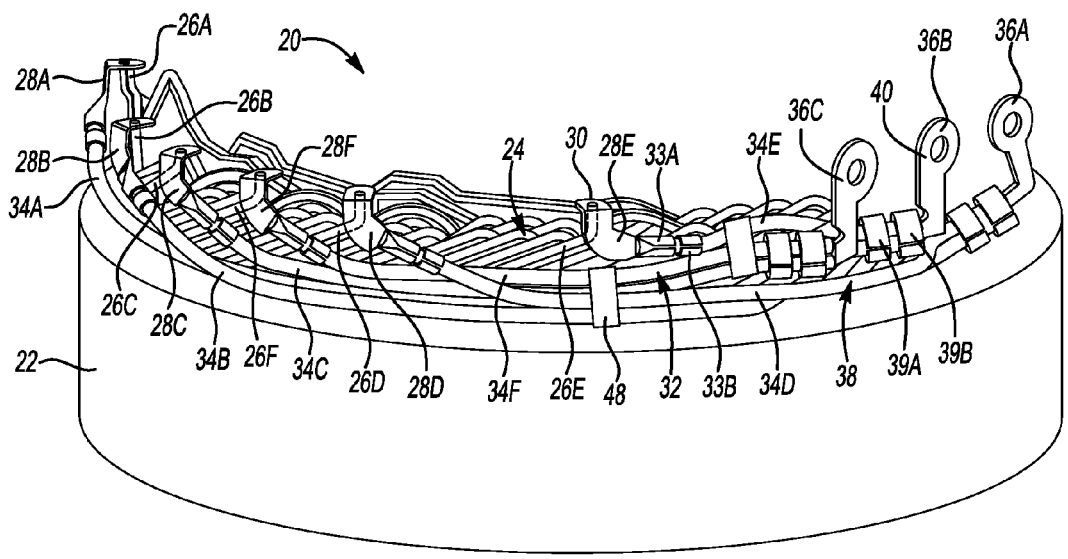
FIG. 2 is a partial schematic perspective illustration of a stator assembly having common phase lead connection terminals.

FIG. 2 is a partial schematic perspective illustration of a first embodiment of a stator assembly 20 for an electric motor 44 (shown in FIG. 3) in accordance with the present invention. The stator assembly 20 includes a stator stack 22 having a plurality of conductors 24 inserted through and extending therefrom. In the embodiment shown, the stator assembly 20 is for an electric motor 44, shown in FIG. 3, which is a delta connected motor. Thus, the plurality of conductors 24 includes six lead conductors 26A-F. The type of electric motor and number of lead conductors 26A-F may vary as is known to those skilled in the art. For example, the stator assembly 20 may be for a Y-connected motor resulting in only three lead conductors.

The conductor terminal 28A-F are mounted on or near the ending of each of the lead conductors 26A-F. The conductor terminals 28A-F may be connected or secured, to the lead conductors 26A-F to form an electrical and mechanical connection, such as by welding or brazing. The conductor terminals 28A-F would be connected or secured, to the lead conductors 26A-F after being assembled or crimped on the lead conductors 26A-F. The conductor terminals 28A-F are a common stamped part with the other conductor terminals 28A-F. Each of the conductor terminals 28A-F includes a first attachment portion 30 for connecting the lead conductors 26A-F to the conductor terminals 28A-F. Each of the conductor terminals 28A-F also includes a second attachment portion 32 for connecting wires 34A-F to the conductor terminals 28A-F. For example, in the embodiment shown, the second attachment portion 32 is a crimped attachment between the wires 34A-F and the conductor terminals 28A-F. The wires 34A-F are connected to the conductor terminals 28A-F at the second attachment portion 32 and leads from the conductor terminals 28A-F to one of a plurality of phase lead connection terminals 36A-C.

In the embodiment shown, there are three phase lead connection terminals 36A-C. As mentioned above, the number of lead conductors 26A-F attached to each phase lead connection terminal 36A-C may vary depending on the type of motor connection being employed, as is known by those skilled in the art. For the embodiment shown, the three phase lead connection terminals 36A-C each receives two wires 34A-F. For example, the first phase lead connection terminal 36A is connected to a first wire 34A for the first lead conductor 26A and to the fourth wire 34D for the fifth lead conductor 26D.

Each phase lead connection terminal 36A-C is a common stamped component with the other phase lead connection terminals 36A-C. The phase lead connection terminal 36A-C has a first attachment portion 38 for attaching two of the wires 34A-F. In an embodiment having a different motor connection arrangement in use, there may be fewer or greater wire connections included with the first attachment portion 38. A second attachment portion 40 forms the connection leads from the stator assembly 20.

Each of the wires 34A-F varies in length from one another. The length of each of the wires 34A-F is based upon the relative angular position of the associated lead conductor 26A-F and the required angular position of the phase lead connection terminal 36A-C about the circumference of the stator assembly 20. Additionally, the wires 34A-F allow for a flexible connection between the lead conductors 26A-F and the phase lead connection terminals 36A-C. The flexible wires 34A-F can be easily adjusted to account for build tolerances and rotation of the stator assembly 20 relative to the terminal block 42 (shown in FIG. 3). Furthermore, the wires 34A-F are insulated to electrically isolate the wires 34A-F from the stator stack 22 and the plurality of connectors 24.

The second attachment portion 32 of the conductor terminals 28A-F includes a first crimping portion 33A and a second crimping portion 33B. The first crimping portion 33A and the second crimping portion 33B are crimped around the insulation coating on the respective wires 34A-F creating a strain relief Likewise, the first attachment portion 38 of the phase lead connection terminals 36A-C includes a first crimping portion 39A and a second crimping portion 39B. The first crimping portion 39A and the second crimping portion 39B are also crimped around the insulation coating on the respective wires 34A-F to create a strain relief.

Figure 3:
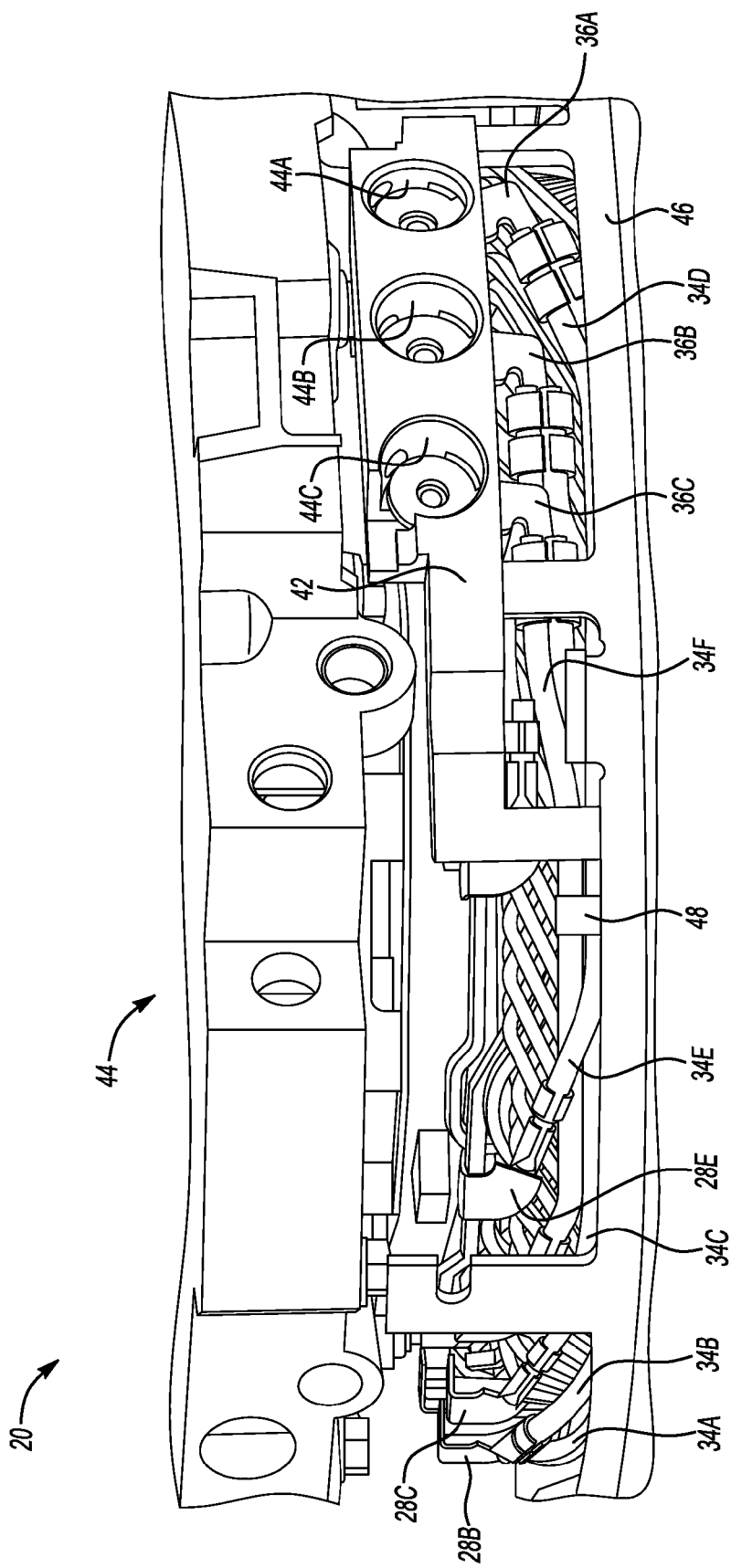
FIG. 3 is an enlarged schematic perspective illustration of a stator assembly of FIG. 1 assembled with a terminal block in an electric motor.

FIG. 3 is a partial schematic perspective illustration of the stator assembly 20 of FIG. 2 with a terminal block 42. The stator assembly 20 is secured to a motor housing 46 for the electric motor 44. The terminal block 42 is also mounted to the motor housing 46. When assembled with the motor housing 46, the phase lead connection terminals 36A-C are aligned with connection ports 44A-C defined by the terminal block 42. As discussed above, during assembly of the stator assembly 20, the phase lead connection terminals 36A-C can be placed on the stator assembly 20 in any angular position about the circumference of the stator assembly 20 that is desired. Thus, the stator assembly 20 may be placed in a desired angular position with respect to the terminal block 42 by arranging the phase lead connection terminals 36A-C in the associated angular position on the circumference of the stator assembly 20. Rotating the stator assembly 20 relative to the terminal block 42 may allow for better packaging of the stator assembly 20 and terminal block 42.

In addition, due to the flexibility of the arrangement the wires 34A-F may be pre-assembled into a wiring harness 48. The wiring harness 48 would include the phase lead connection terminals 36A-C, the wires 34A-F and the conductor terminals 28A-F. The wiring harness 48 may additionally include the terminal block 42.

While the best modes for carrying out the invention have been described in detail, those familiar with the art to which this invention relates will recognize various alternative designs and embodiments for practicing the invention within the scope of the appended claims.

The invention claimed is:

1. A stator assembly comprising:
a stator stack;
a plurality of lead conductors extending from the stator stack;
a plurality of conductor terminals each connected to a respective one of the plurality of lead conductors;
a plurality of wires each connected to a respective one of the plurality of conductor terminals; and
a plurality of phase lead connection terminals, wherein each of the plurality of phase lead connection terminals is connected to at least one of the plurality of wires.

2. The stator assembly of claim 1, wherein each of the plurality of conductor terminals is mounted to a respective one of the plurality of lead conductors.

3. The stator assembly of claim 1, wherein the plurality of wires are flexible insulated wires.

4. The stator assembly of claim 1, further comprising a terminal block defining a plurality of connection ports, wherein the plurality of phase lead connection terminals are each aligned with a respective one of the plurality of connection ports.

5. The stator assembly of claim 1, wherein the plurality of lead conductors is six lead conductors and the plurality of phase lead connection terminals is three phase lead connection terminals.

6. A wiring harness for a stator assembly comprising:
a plurality of phase lead connection terminals;
a plurality of wires, wherein each of the plurality of phase lead connection terminals is connected to at least one of the plurality of wires;
a plurality conductor terminals, wherein each of the conductor terminals are connected to a respective one of the plurality of wires; and
wherein the plurality of conductor terminals are configured to be connected to a respective one of a plurality of lead conductors for a stator assembly.

7. The wiring harness of claim 6, further comprising a terminal block defining a plurality of connection ports, wherein the plurality of phase lead connection terminals are each aligned with a respective one of the plurality of connection ports and secured to a terminal block.

8. A method of assembling a stator assembly comprising:

connecting one of a plurality of conductor terminals to a respective one of a plurality of lead conductors extending from a stator stack;

connecting one of a plurality of wires to a respective one of the plurality of conductor terminals; and connecting a plurality of phase lead connection terminals to the plurality of wires such that each of the plurality of phase lead connection terminals is connected to at least one of the plurality of wires.

9. The method of claim 8, wherein each of the plurality of conductor terminals is mounted to a respective one of the plurality of lead conductors.

10. The method of claim 8, further comprising aligning the plurality of phase lead connection terminals with a respective one of a plurality of connection ports defined by a terminal block.

* * * * *